United States Patent [19]

Swanson

[11] Patent Number: 4,751,029
[45] Date of Patent: Jun. 14, 1988

[54] METHOD AND MEANS FOR MOLDING PLASTIC PARTS

[75] Inventor: Clifford D. Swanson, East Lansing, Mich.

[73] Assignee: Nicholas Plastics, Inc., Grand Rapids, Mich.

[21] Appl. No.: 922,123

[22] Filed: Oct. 22, 1986

Related U.S. Application Data

[63] Continuation of Ser. No. 723,198, Apr. 15, 1985, abandoned.

[51] Int. Cl.[4] ............ B29C 43/06; B29C 43/18; B29C 43/54; B29C 43/58
[52] U.S. Cl. ............ 264/40.4; 425/394; 425/442; 425/444; 425/451; 425/451.2; 425/451.5; 425/451.9; 425/453; 425/461; 425/DIG. 16; 425/DIG. 108; 425/DIG. 128; 425/DIG. 201; 425/113; 425/120; 425/127; 425/129 R; 425/134; 425/148; 425/150; 425/257; 425/261; 425/325; 425/377; 425/392; 249/82; 249/158; 249/170; 264/2.2; 264/2.4; 264/245; 264/275; 264/297.6; 264/313; 264/318; 264/323; 264/325; 264/337
[58] Field of Search ............ 264/2.2, 2.4, 40.4, 264/245, 275, 279, 297.6, 299, 313, 318, 320, 325, 337, 323, DIG. 64, DIG. 65; 425/113, 117, 120, 127, 129 R, 134, 140, 148, 150, 257, 261, 325, 377, 392, 394, 441, 442, 443, 444, 447, 451, 451.2, 451.5, 451.6, 451.9, 453, 461, 808, DIG. 16, DIG. 128, DIG. 108, DIG. 201; 249/82, 155, 158, 170; 222/5

[56] References Cited

U.S. PATENT DOCUMENTS

| | | | |
|---|---|---|---|
| 2,745,138 | 5/1956 | Beattie | 249/82 |
| 3,706,827 | 12/1972 | Nott et al. | 264/176.1 |
| 3,801,255 | 4/1974 | Meyer et al. | 425/145 X |
| 3,829,271 | 8/1974 | Taylor | 425/DIG. 201 |
| 4,021,178 | 5/1977 | Braun | 425/325 |
| 4,514,159 | 4/1985 | Magerle | 425/261 X |
| 4,524,516 | 6/1985 | Wiechard | 264/275 X |
| 4,537,737 | 8/1985 | Crowe | 264/40.4 |

Primary Examiner—Jeffery Thurlow
Assistant Examiner—Leo B. Tentoni
Attorney, Agent, or Firm—Price, Heneveld, Cooper, DeWitt & Litton

[57] ABSTRACT

A system for molding elongated ribbon-like products from thermoplastic materials utilizing a plurality of molds which are moved in tandem along a production line. As the molds are moved along the line at successive stations they are, while open, thermally adjusted to a temperature suitable for forming the product to be molded and then a ribbon of plastic is deposited in them. They are then closed and cooled and reopened and the molded product removed. The system utilizes only enough molding pressure to assure distribution of the plastic to all parts of the mold cavity and shaping of the molded product to the geometric design of the mold. The system includes a transfer means for the molds which returns the emptied molds for recycling through the molding process.

39 Claims, 4 Drawing Sheets

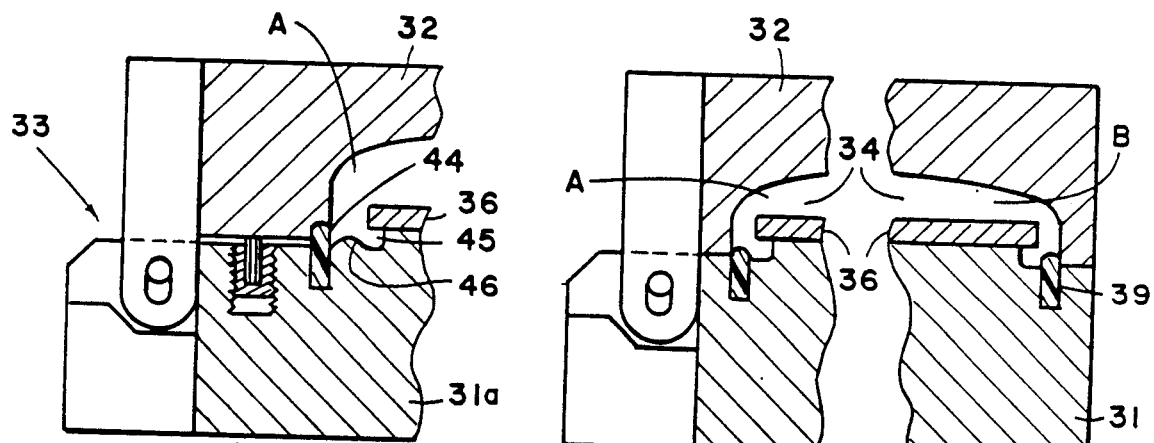
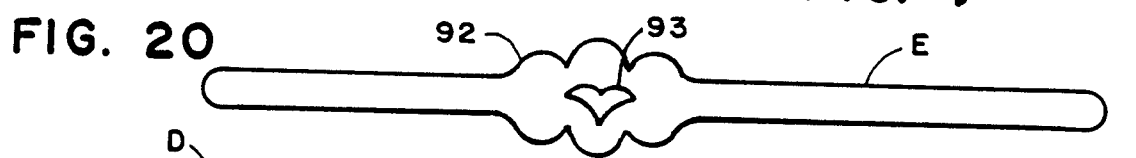
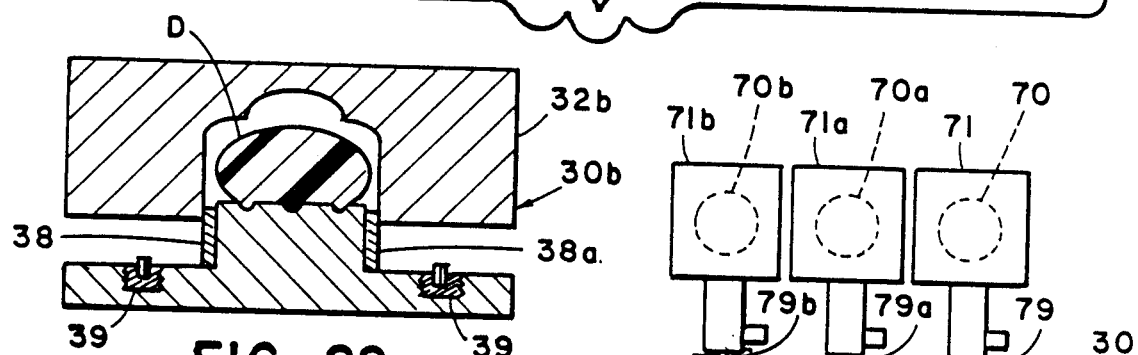
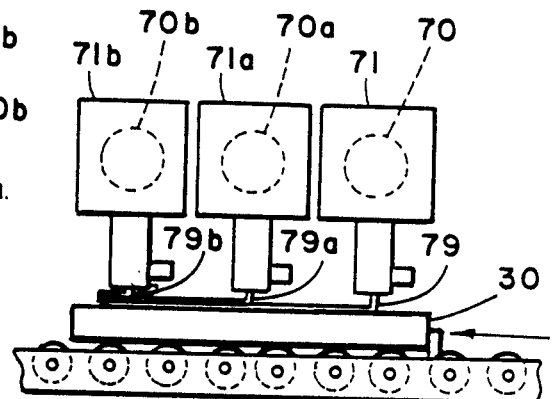
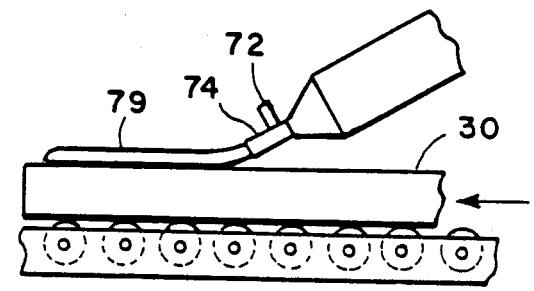
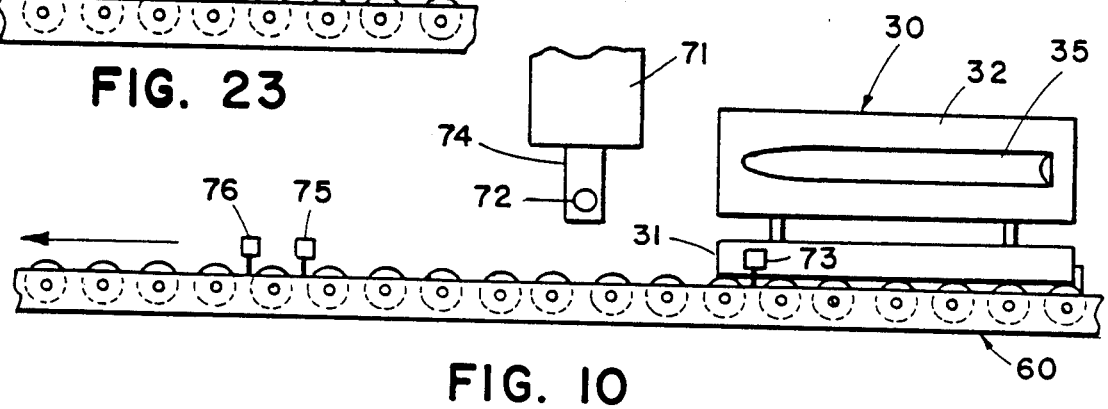

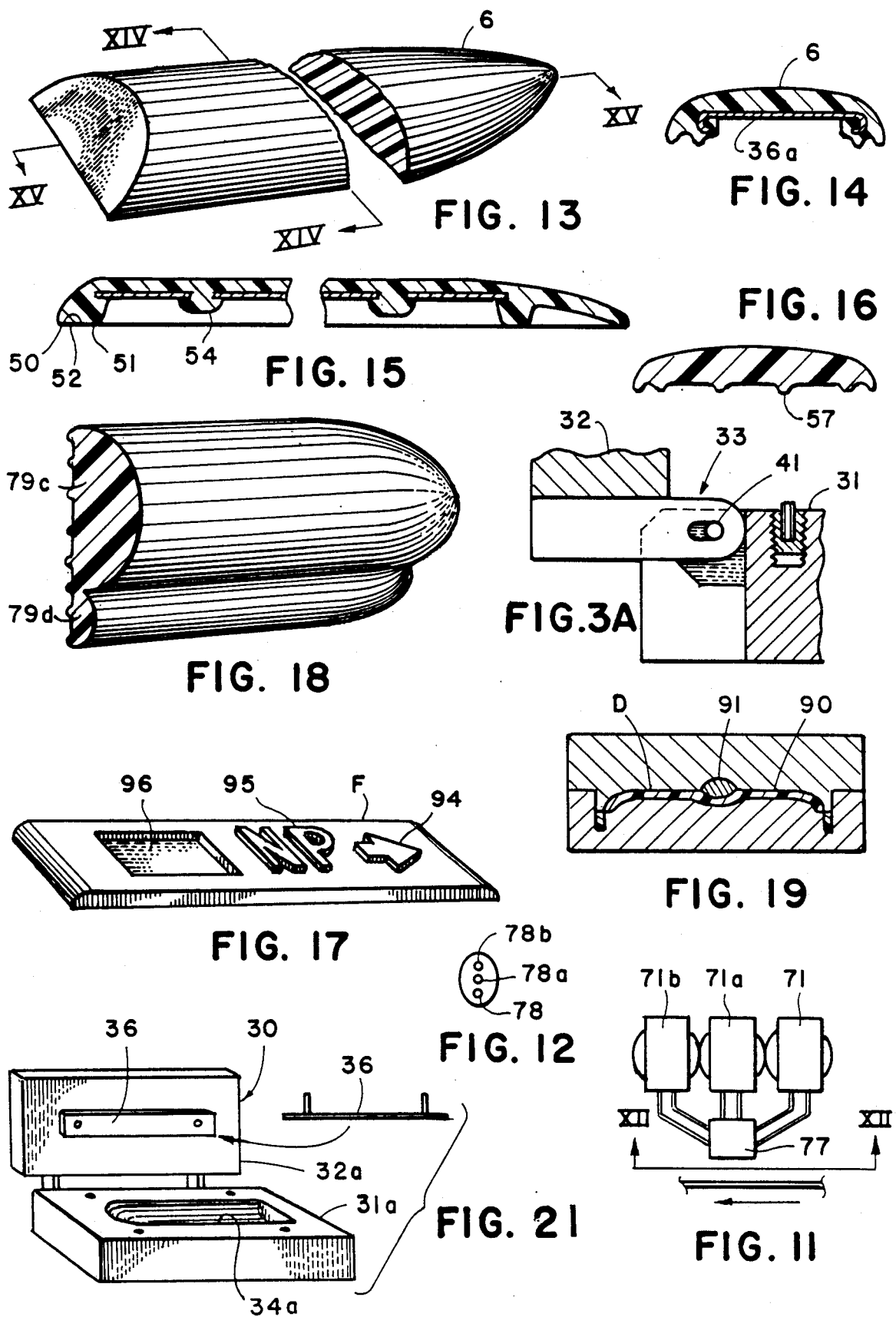

METHOD AND MEANS FOR MOLDING PLASTIC PARTS

This is a continuation of application Ser. No. 723,198, filed Apr. 15, 1985 now abandoned.

FIELD OF THE INVENTION

This invention relates to molding of parts from thermoplastic materials which parts have heretofore been made either by extrusion or by high pressure injection molding. Particularly the invention is addressed to the low pressure molding of such parts in relatively inexpensive, low strength molds.

BACKGROUND OF THE INVENTION

There are certain molded plastic products which by virtue of their design should be molded, shaped and finished in the mold cavity of a closed mold such as the cavities conventionally used in injection molding. However, because of their design, molding in such cavities is not feasible. Such parts are used in various types of products including furniture, architectural, appliance and automotive products. While the following description will focus on automotive products, it will be understood that such focus is only exemplary as is not to be considered as a limitation on the utility or scope of the invention.

One example of a product for which state of the art molding methods are inadequate is the body side molding applied by automobile manufacturers ro the side panels of automobiles to protect the panels and their finish from indentation and paint damage resulting from being hit such as by the open door of an adjacent vehicle. Another example is a similar rub strip applied to the bumpers of cars to provide an impact and abrasion resistant defense for the bumper and for the object contacted by the bumper. These rub strips are designed into the ornamental appearance of the vehicle and therefore must have a finished and decorative appearance. To satisfy this function they should be made as a unitary part with all visible surfaces having a finished and ornamental appearance. This can be accomplished by injection molding. However, injection molding has serious limitations.

In many designs these strips are long ribbon-like members and in the case of rub strips for bumpers may have a length of five, six or more feet. To injection mold such a product requires very large massive molds. Such molds, built to withstand the high pressures required for injection molding, must be of tool steel, have thick walls and are very expensive. Further, by virtue of the total mass of metal involved substantial quantities of thermal energy are required to heat them and substantial cooling capaciry may have to be provided to cool the injected charge. This requires expensive, large capacity support equipment and lengthens the molding cycle. All of this adds up to a cost factor which limits injection molding for such parts.

There are other deficiencies of injection molding when applied to such products. Some of the products require inserts such as a metallic reinforcement to be incorporated as an integral part of the product. The placement of the inserts into large multi-cavity injection molding dies requires holding them open for significantly longer periods, lengthening the molding cycle and increasing the operating costs.

A further limitation is that injection molding methods have only limited capacity to provide an acceptable product when the product requires a plastic having a high level of an individually visible filler such as metallic particles. Because of the flow patterns generated within the mold during high pressure injection, uniformity of filler distribution within the plastic is frequently not possible, giving the finished product an unacceptable appearance. Because of these limitations, these products have up to now been manufactured by extrusion. However, extrusion also has a number of disadvantages. One of the most important of these disadvantages is the fact it cannot produce a product with molded ends in a single operation. There is no method by which the ends of a product such as a body side molding or bumper rub strip can be shaped and finished as part of the initial extrusion step. To deal with this problem, one of the state of the art practices has been to extrude the main body of the part which is then placed in a mold and the ends molded on to it. This requires the cost of additional tools and the use of injection moding equipment. Thus, this method requires the cost burden of expensive equipment. In addition, it is a labor intensive procedure and, therefore, costly. Further it normally does not produce a product having the quality of appearance of a product made in a single step. Another state of the art practice has been to mold, as by injection, separate end pieces which are then bonded to the ends of the extruded strip. No matter how much care, labor and expense is invested in this procedure the resulting product the bond lines in the final product are all but impossible to conceal for various reasons including among others the difference in shrinkage between parts made under different pressures and molding under low pressure conditions coupled with the differences which occur within the daily practice of the processes. Furthermore the procedure also is labor intensive and, thus, expensive.

A serious limitation on extrusion is that in many cases it is not applicable where reinforcement members must be incorporated as an integral part of the final product. Where the reinforcement is a strand-like member such as continuous fiber glass filaments or one or more wires or a woven cable or a continuous ribbon such as of stainless steel or aluminium, this does not present a serious problem. However, if the insert is in the form of discrete pieces or its ends have to be recessed from the ends of the part, then the reinforcement must be assembled to and bonded to the plastic subsequent to the extrusion operation has been completed. If the strip has accessories on it such as grommets or fasteners or the like preassembled to it, the only way to use extrusion is to extrude the plastic first and subsequently bond it to the reinforcement. This is a slow, labor intensive and expensive procedure. Despite the shortcomings of the plastic molding technology for the manufacture of such parts as automotive rub strips that have been described in the preceding paragraphs, this technology was the state of the art until this invention.

Another limitation upon conventional molding techniques has been their impracticality when the material incorporates metallics. The high pressures and flow patterns characteristic of injection molding produce swirls and bleedouts in the plastic. These normally are not a problem when the plastic is an opaque, single color but becomes a serious problem when the plastic contains visual particulates such as metallics which make these patterns visible. While extrusion can successfully extrude parts with acceptable uniformity of metallics distribution, the need for finished ends becomes an insurmountable problem. Neither the post-extrusion molding technique nor the bonded-on end technique can hide the pattern interruption which is inherent where the original and subsequently molded parts are joined.

BRIEF DESCRIPTION OF THE INVENTION

This invention introduces the concept of molding such products within the cavities of relatively inexpensive, low pressure molds into which the plastic material is introduced in ribbon-like form while the mold is open and then shaped to the configuration of the mold cavity only by the relatively low pressure created by the step of closing the mold and holding it closed until sufficient cooling has occurred to permit the part to be removed without loss or distortion of its shape. In the closing step a limited degree of pressure is created by the compression needed to distribute the material and entirely fill the mold cavity. It is a feature of this invention that the plastic being deposited in the mold only has to undergo very limited flow or migration or movement during the mold closing, thus eliminating swirls and non-uniform flow patterns. This feature permits the invention to utilize minimum molding pressures thus eliminating structuralized stress points. Thus, the invention, while very advantageous in the molding of certain types of parts from all or substantially all thermo-plastics, is particularly advantageous in molding plastics loaded with visual metallics particles.

The invention also has significant advantages in the molding of materials which require high molding temperatures such as vinyl. Because individual molds are used and the molding process utilizes only low pressures, the heating and cooling of the molds can be accomplished in a much shorter operating cycle. Further, the heating and cooling is carried out at stations other than the one where the molds are filled, thus, permitting faster production.

The invention also includes the concept of utilizing a number of individual molds which are conveyed in tandem along a production line through a plurality of work stations at which the molds are successively prepared to receive the plastic material, then charged with the plastic material, closed and held closed while cooled to set or cure the plastic. The molds are then opened, emptied of product and returned to the preparation station for initiation of a new cycle of molding.

The system, while able to make a completely finished product in a single molding step, for the first time isolates the mold charging function from all the related functions such as mold preparation including insert installation, mold closing, cooling and finished part ejection. Therefore, for the first time the single function of the rate at which the plastic is depostied in the mold becomes the sole controlling production rate factor in a system for molding finished surfaces and shapes on both ends as well as the tops and sides. Therefore, for the first time extrusion rate capacity has been made possible for parts heretofore requiring injection molding techniques.

The system is capable of being fully automated from preparation through final product inspection. Charging the mold can be by extrusion with accumulation and batch discharge or other methods capable of depositing a ribbon-like charge in the mold. The result of use of the invention is the manufacture of a substantially improved, more uniform product at a significantly reduced cost. The method and means by which the objectives are obtained will be made clear by the following drawings and description.

BRIEF DESCRIPTION OF THE DRAWINGS

FIG. 3A is a fragmentary section view taken along the same plane as FIG. 3 showing the cover pivoted to open position;

FIG. 4 is a broken sectional elevation view taken along the plane IV—IV of FIG. 2;

FIG. 5 is a fragmentary sectional elevation view taken along the same plane as FIG. 3 illustrating a modified construction for the mold cavity;

FIG. 9 is a fragmentary elevation view of a charging station having multiple plastic sources;

FIG. 10 is a fragmentary elevation view of the charging station schematically illustrating controls for the operating of the plastic discharge nozzle;

FIG. 11 is a schematic side view of a multiple plastic charging source for this invention;

FIG. 12 is a bottom view of the nozzle illustrated in FIG. 11;

FIG. 13 is a broken, oblique view of a typical rub strip made by this invention;

FIG. 14 is a sectional view taken along the plane XIV—XIV of FIG. 13;

FIG. 15 is a sectional view taken along the plane XV—XV of FIG. 13;

FIG. 16 is a sectional view similar to FIG. 14 of a part from which the reinforcement has been omitted;

FIG. 17 is an oblique view illustrating exemplary relief configurations which can be molded into the products by this invention;

FIG. 18 is a fragmentary end view of a still further configuration capable of being molded by this invention;

FIG. 19 is a section elevation view similar to FIG. 3 illustrating a product molded from multi-ribbons of plastic;

FIG. 20 illustrates a product of a different configuration which can be molded by this invention;

FIG. 21 is an oblique, somewhat schematic view of an open mold in which the cavity is in the base portion and the reinforcement element is secured to the cover portion;

FIG. 22 is similar to FIG. 3 showing a somewhat modified construction for the mold; and FIG. 23 is a fragmentary view of a modified construction for the discharge nozzle for the plastic material.

DESCRIPTION OF THE PREFERRED EMBODIMENT

The numeral 10 refers to a system arranged to transport a plurality of individual molds in successive order through a number of work or service stations. At each of the stations one or more functions necessary to mold a plastic part is performed. The type and number of functions or steps performed depends in part upon the result desired and the design of the part to be manufactured.

Figure 1:
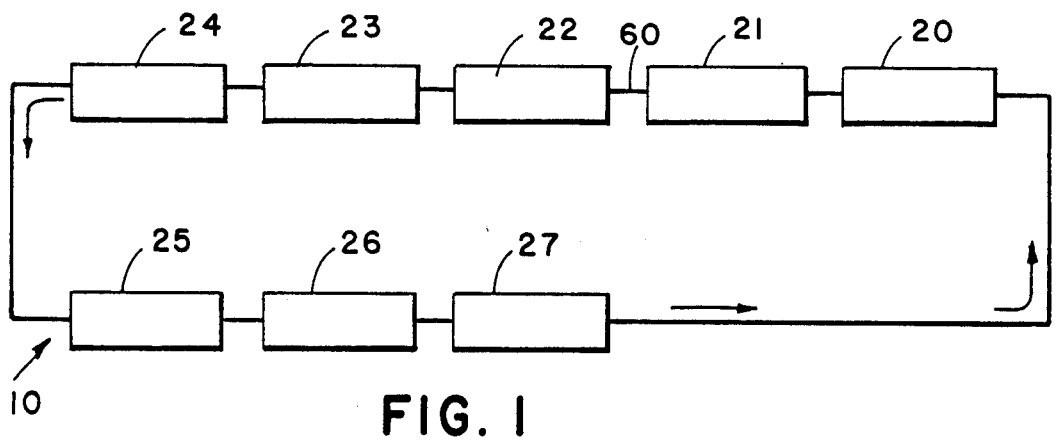
FIG. 1 is a schematic layout of a continuous production system incorporating this invention.

FIG. 1 schematically illustrates a typical system in which the molds, while open, are initially inspected at station 20 to be certain they are fully open, are in good operating order and free from any debris. The molds are then passed on to a station 21 at which they may be cooled or heated. The heating can be accomplished by suitable means such as radiant heat, passing over a hot surface or subjected to an open flame for a period sufficient to prepare them to receive a charge of plastic. The cooling could also be accomplished by suitable means such as a stream of cold air.

After heating, the molds are passed to station 22 where inserts such as reinforcement members may be placed in the mold and, if not already preheated, they are also heated, if necessary.

The molds are then passed through station 23 where each mold is charged with the plastic material from which the part will be made. After the charge of plastic has been placed in the mold, the mold is closed. This can be done at station 23 or it may be the function of a separate station 24. Once the mold is closed and the available space in the mold cavity has been occupied by the charge of plastic, the mold then proceeds through the cooling station 25 in which the mold cover is held closed. The cooling can be accomplished in various ways including air or water cooling. The cooling continues until the plastic has hardened or cured sufficiently that the molded part or product can be removed without loss or distortion of the shape created by the mold cavity, i.e., it maintains its geometric integrity. When this stage is reached, the mold is opened at station 26 and the part removed at station 27. The empty mold is then returned to station 20 for inspection and reuse.

It will be recognized that some of the functions can be combined in a single station such as charging and closure or opening and product removal. Other stations can be omitted or bypassed such, as example, station 20, if inspection unnecessary or station 22, if the product has no insert or reinforcement.

Since the plastic material is introduced into the mold while the mold is open, the system is by its very nature a low pressure molding system. This being the case the molds need not be of steel nor are thick wall structures necessary to withstand the molding pressures. Aluminum alloy materials are quite satisfactory for the molds. Aluminum alloys are far less expensive to prepare than steel. Because thick wall sections are not required, the molds can be substantially smaller and lighter in weight. With less mass to heat and cool, the thermal energy demands are materially reduced from those required by the conventional steel molds required for injection molding. Further, the molding cycle is shortened significantly by the increase in thermal transfer efficiency created by the use of efficient conductive materials, i.e. aluminum.

Figure 3:
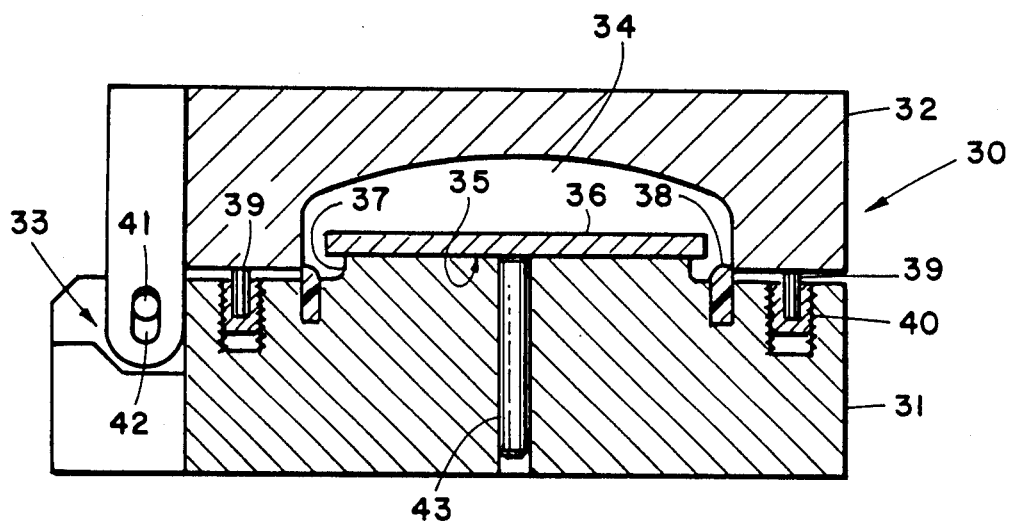
FIG. 3 is an enlarged sectional elevation view taken along the plane III—III of FIG. 2 illustrating the assembled and closed mold with a reinforcement element seated in the mold.
Figure 2:
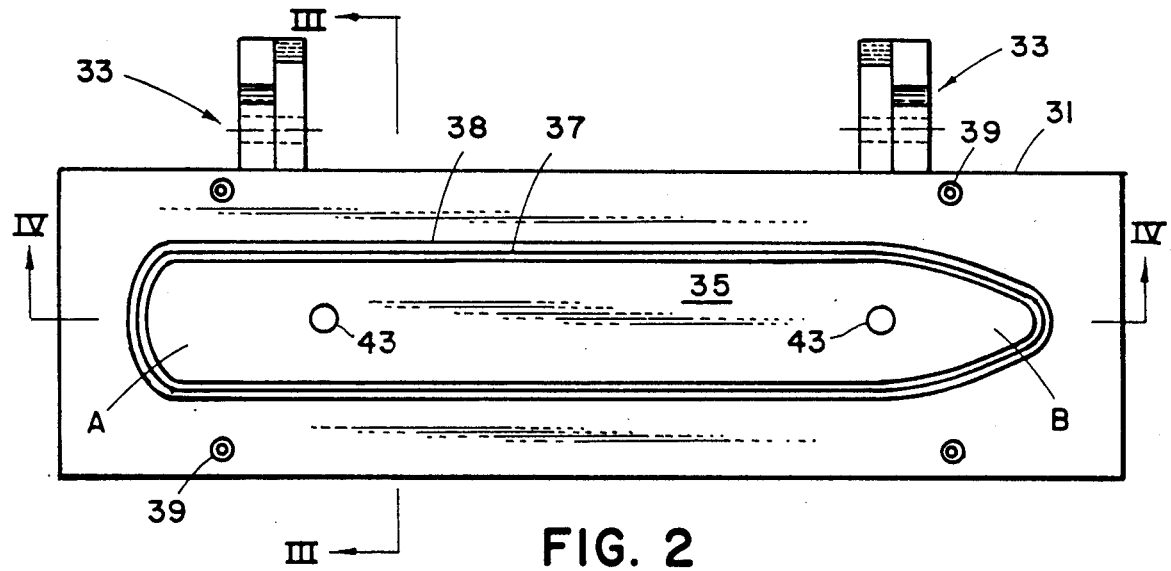
FIG. 2 is a top view of the base or lower portion of a mold used in the system illustrated in FIG. 1.

While the term "mold" is used throughout the description, in a broader sense it is a tool used for forming and shaping a specific product. However, because it has an internal cavity and shapes the product while closed, it functions in the sense of a mold as that term is conventionally used. The precise design of the molds will be determined by the size and design of the product to be molded. However, the basic principles of a typical mold 30 are illustrated in FIGS. 2 and 3. In this construction the mold 30 has a base portion 31 and a cover 32 joined by a hinge 33. The cover has a cavity 34 recessed into it. Depending to some extent upon the design of the parts, the cavity can be in base portion. It is also entirely possible to have portions of the cavity in both the base and cover.

The base portion 31 has a seat 35 for the insert or reinforcement 36 which will become part of the molded product. While the insert is illustrated in FIGS. 3 and 15 as a flat plate or bar, it can have any suitable shape as, for example, the shallow C-shaped channel 36a (FIG. 14). On each side of the seat the base portion has a channel-like recess 37, the outer wall of which is formed by a shut-off dam 38. The dam 38 is preferably fabricated of a suitable wear resistant material such as Teflon and is designed to seat tightly against the face or wall of the cavity 34 when the mold is closed. Spaced outwardly from each side of the dam 38 are stop pins 39. These are seated in threaded bushings 40 which arrangement permits the extension of the pins above the top surface of the base portion to be adjusted to precisely size the available space with the cavity 34. The pins also assure an effective seal between the dam and the cavity wall since these pins limit and control the closure of the mold.

The hinge 33 is designed to accommodate this adjustment by permitting the final closing movement of the cover to be vertical rather than arcuate. This is possible because the hinge incorporates a lost motion connection. The hinge pin 41 on the cover seats in a vertical slot 42. This permits limited vertical travel of the cover so that its final closing movement and its initial opening movements can be vertical. In closing, this permits a seal to be effected against the dam 38 before the final closing movement is made seating the cover on the pins 39. Thus, the deposited charge of plastic is confined within the cavity and cannot lose any of its volume by escaping the cavity. This arrangement coupled with accurate measurement of the volume of the charge assures creation of the necessary molding pressure while keeping it to a minimum. In opening, the vertical travel permits the mold to be released from any surface ornamentation given to the product before arcuate movement of the cover is required. This arrangement also permits the cover when open to be seated in a stable, vertical position offset from the base portion to provide access for charging the mold (FIG. 3A). FIG. 22 illustrates that the tool or mold 30b may have substantial vertical movement after effecting a peripheral seal to effect distribution and final shaping of the charge D. In this case the shut-off or seal is effected by the dam 38a well before the cover 32b engages the stop pins 39.

Arranged along the centerline of the mold are a pair of knock-out pins 43 for removing the molded product (FIG. 2). It will be recognized that these pins 43 could be aligned with the studs which will be used to secure the molding to the end product such as a vehicle. The studs will have been preassembled to the reinforcement, if one is used, and inserted in the pin openings to mount them in the mold. If no reinforcement is used, the pins will be equipped with a suitable head to be molded into the body of plastic and serve the same functional purposes both during molding and subsequent use of the molded product.

The length and width of the cavity 34 will be governed by the design of the part. For example, a short body side molding could have a width of 2 to 3 inches and a length of 8 to 12 inches. A door panel molding typically may have a width of 2 to 10 inches and a length of 50 inches. A bumper rub strip could have a width of 2 to 4 inches and a length of 70 to 80 inches. These are merely exemplary but the dimensions illustrate the non-cost effectiveness of attempting to make such products by conventional methods such as injection molding.

It will be seen from FIGS. 2 and 4 that both ends A and B of the molded product are molded integrally with the main body of the product and to the finished shape of the product (see product G, FIGS. 13 and 14). This illustrates the fact that such a product cannot be made by extrusion in a single manufacturing step.

FIG. 5 illustrates a modification of the base mold portion 31a in which the mold 30a has a peripheral recess 44 to form a lip such as the lip 50 illustrated in FIG. 15. Inward of the recess the mold has a groove 45 separated from the lip forming recess 44 by a rib 46. The groove 45 creates a ridge 51 on the product separated from the lip 50 by the channel 52 (FIG. 15). The ridge 51 provides a means by which the strip can be bonded to a support surface such as a panel with the channel 52 providing a means for collecting any excess adhesive and preventing it from escaping beyond the lip 50. FIG. 16 illustrates the fact that a plurality of the ribs 57 can be provided for bonding the strip to its support. These are merely illustrative of the many constructions which can be incorporated into the final product.

In addition to bonding of the plastic and reinforcement at their surface-to-surface contact, this invention, since it utilizes some pressure, can use the technique of forming anchor buttons 54 which are formed by forcing some of the plastic through openings in the insert (FIG. 15). If the gradual mold closing technique is utilized, the creation of sinks at the location of the buttons can be eliminated. This provides an alternative means of anchoring the insert to the plastic where bonding is either ineffective or only marginally effective.

Figure 6:
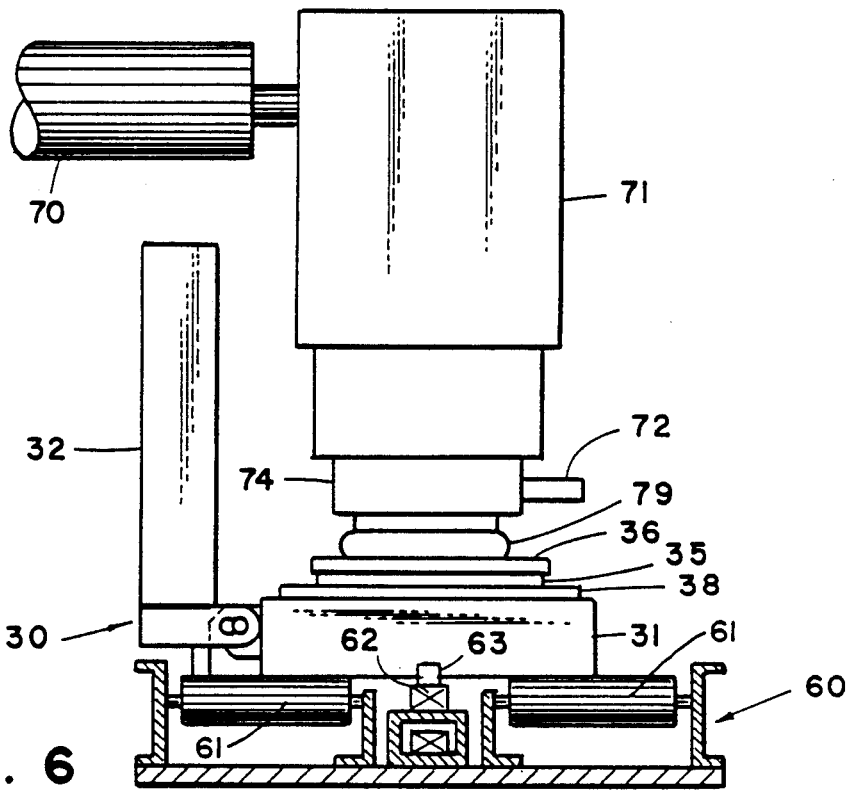
FIG. 6 is a sectional elevation view of the plastic charging station schematically illustrating one type of equipment usable to charge the mold.

Because the molds 30 are designed for low pressure molding and, therefore, can be less massive and made from lighter weight materials such as aluminum, the invention can utilize the advantages of a continuous production line. The molds 30 are transported from station to station and through the stations by suitable means such as a conveyor. The conveyor can be any of the many types available in the industry. FIG. 6 is illustrative of one type of conveyor. The conveyor 60 has a track on which the molds 30 are transported on rollers 61. The molds are propelled by the driven chain 62 equipped with pusher dogs 63. The conveyor could be of the type which moves all the molds simultaneously through all the stations at a uniform speed. The fact that the functions to be performed at the various stations require intervals of different lengths ro be performed may be accommodated by providing stations of different lengths. Another approach is that of providing an accumulator-type conveyor which permits differentiation in the rate of movement through each station including allowing the mold to remain stationary for a predetermined dwell period at some of the stations. Each station could be equipped with its own mold movement drive system with the conveyor merely providing transport between the stations.

The molds after being emptied of the molded product are returned to the head of the line for reuse. The return conveyor can be a continuation of the conveyor which passes through the various stations at which the product is made. However, it can also be a separate conveyor to which the molds are transferred after emptying or after cooling and before product removal. Particularly is it likely a separate return conveyor would be used when the molds are long and thus prohibit the use of curves and the like in the conveyor line. All of these approaches to the actual transport of the molds are within the state of the art capabilities of the material handling industry. This invention is not directed to the specific construction of the mold system but rather to a molding system one aspect of which is the capability of utilizing the productivity advantage of progressive movement of the molds through all of the manufacturing steps.

DESCRIPTION OF THE MOLDING CYCLE

The molds 30, one by one in successive order, are passed through the inspection station 20. At this station the interior of each mold is inspected to be certain that it is in proper condition to be used. The inspection may be manual or automated. In most cases the inspection function can be performed while the molds are in continuous movement through the station.

The conveyor then transports them to the next station which may be either heating or insert placement or both. In the case of most products, at least the initial heating of the mold will precede mounting of a reinforcement or other insert. At this station the temperature of the mold will be adjusted to that which assures proper flow of the plastic in the mold when it is closed after being charged at station 23. Normally this is heating which can be done by radiant heaters arranged in a pattern to heat both the base 31 and cover 32. Advantageously this can be done in an elongated tunnel type of structure through which the mold is passed by the conveyor. While this function can be performed on smaller molds without interrupting the movement of the molds, on larger and longer molds this function is better performed while the mold is held stationary in the heating station. With long molds this will assure uniform heating throughout the length of the mold.

The heating function can be completely automated with thermal sensors controlling the delivery of the heat and measuring the temperature of the mold and terminating the application of heat when the desired temperature has been attained.

If the heating station 21 precedes the insert mounting station, the mold on leaving the heating station will enter the insert station 22. Here any inserts such as a reinforcement strip or insert 36 is secured to the mold. Depending on the design of the part and of the mold, the insert 36 may be secured to either the base 31 as illustrated in FIG. 3 or to the cover as illustrated in FIG. 21. The insert may have been pretreated with a bonding agent to assure bonding of the plastic to the insert. Also the insert may have been preheated before installation. If it has not been heated or has only been partially heated, it will be necessary to complete the heating of the insert while at station 22. This can be effectively done by use of a radiant heat source such as electrical resistance. If the insert installation is time consuming it may be necessary to add make up heat to the mold. The several steps can be automated including the installation of the insert and the heating of the insert and the application of any necessary make up heat required by the mold.

The mold is now moved to the charge station 23 where it receives the charge of plastic to be molded. For the purpose of charging the mold with plastic the mold is continuously moved through the station at a precisely controlled speed. Because the speed of movement is an important factor in accurate distribution of the plastic along the length of the mold, the rate of movement of the open mold through this station must be accurately controlled. In fact, the rate of movement may be intentionally varied as the mold passes through to produce certain results as will be explained subsequently. For this purpose station 23 may be equipped with its own separate mold transport system capable of being programmed to accommodate the design of the part to be produced.

The plastic material can be prepared for discharge into the mold in various ways, the choice of which will depend upon the type of plastic, the filler in the plastic and the result to be obtained in the final product. Normally, however, the plastic will be melted and prepared by use of an extruder 70 which discharges the plastic into an accumulator 71 equipped with valve means 72 for controlling discharge to the mold (FIG. 6). It is not only important that the volume of plastic deposited in the mold be precisely controlled but that the start of the discharge and its termination be precisely timed to the position of the mold so that not only will the mold receive the correct volume to fill its cavity but also that the cavity will be completely filled at both ends without requiring any of the plastic to be forced out of the mold. For this purpose a mold position sensor 73 (FIG. 10) such as an electric eye can be used to detect the approach of the mold and generate a signal which, with appropriate time lapse, will open the valve 72 to initiate plastic discharge as the lead end of the mold cavity becomes aligned with the discharge nozzle 74. The nozzle 74 will discharge the plastic as a ribbon 79 which will be laid, normally at a uniform rate and volume, along the length of the mold cavity until the mold triggers the cut off sensor 75. This will close the valve 72 to terminate the plastic flow at the precise point to effectively fill the trailing end of the mold cavity. By means of a time lapse built into the circuitry or by means of an additional sensor 76, a suitable mechanism is activated to close the mold.

An alternative to use of the electric eye sensors could be the use of lasers which read the mold cavity itself. In the case of the mold illustrated in FIGS. 2 and 3, it could be positioned horizontally to read the cavity in the cover and, in the case of the mold illustrated in FIG. 21, it could be positioned vertically to read the cavity in the base portion 31a.

During the period the valve 72 is open, the combination of the shape of the discharge die or nozzle 74 and the movement of the mold past the nozzle will result in the creation of a rod-like, rope like or ribbon-like deposit 79 (FIG. 6) of plastic extending substantially the full length of the mold cavity.

It will be noted from FIGS. 6 and 10 that the nozzles discharging the plastic are located close to the mold surface on which the plastic is delivered. This is part of the process because in effect the plastic flows into the mold rather than being forced into it. This arrangement has the objective of eliminating any internal stresses which might result from twisting or stretching or other manipulation of the ribbon. In fact, it is entirely possible to take this procedure a step further by inclining the nozzle or nozzles downstream of mold movement as suggested in FIG. 23. The desired width and thickness of this ribbon will be determined by the cross-sectional shape and volume of the mold cavity. When the shape of the cavity narrows, as at the right hand end of the mold 30 illustrated in FIG. 2, means can be provided to progressively restrict the width of the nozzle so that the volume of plastic discharged will be proportional to the capacity of the cavity beneath the nozzle. An alternative means of accommodating the progressive restriction in cavity volume would be to provide a nozzle which is always of restricted width discharging only along the center of the mold. Using such a nozzle, the rate of movement of the mold past the nozzle will be slowed until the cavity begins to narrow at which point movement of the mold will be speeded up to restrict the total volume of deposit per unit of length.

In some cases the design may require the width of the thickness of the product to progressively increase or decrease throughout most or all of the length of the mold. This can be done using this invention by the technique of varying the rate of movement of the mold past the nozzle. In the same manner this invention is capable of molding long products with areas of very different dimension such as the center area 92 of the product E illustrated in FIG. 20. This can be done by the technique of creating a short temporary dwell in the forward movement of the mold. The mold will subsequently impress tne relief design 93 on this center area.

The preceding describes only the simpler and more fundamental procedures suitable for a relatively uncomplicated product design. The application of this invention to more complicated designs will be explained subsequently. It will, however, be recognized that the procedure for charging the mold will basically be the same whether the principal portion of the cavity is in the base portion or the cover since in either case the base portion will be the one to receive the plastic.

Once the mold has been charged with plastic and closed, the cooling process is initiated. Preferably this process is delayed for a suitable dwell period to assure flow or migration of the plastic to all available space within the mold. When this has occurred, cooling is begun. This can be accomplished in any of several ways, all of which are basically conventional. This process can be carried on while the molds are in continuous movement or they can be removed to an auxiliary holding track where they accumulate long enough to effectively cool the molded plastics. This is a conventional practice which relieves the problem of timing resulting from the fact that the cooling process normally requires a greater time lapse than any of the other molding steps including mold preparation, heating or charging. The cooling process can be accelerated in any of several conventional ways such as blowing chilled air over the molds or spraying with or submerging them in water.

Figure 7:
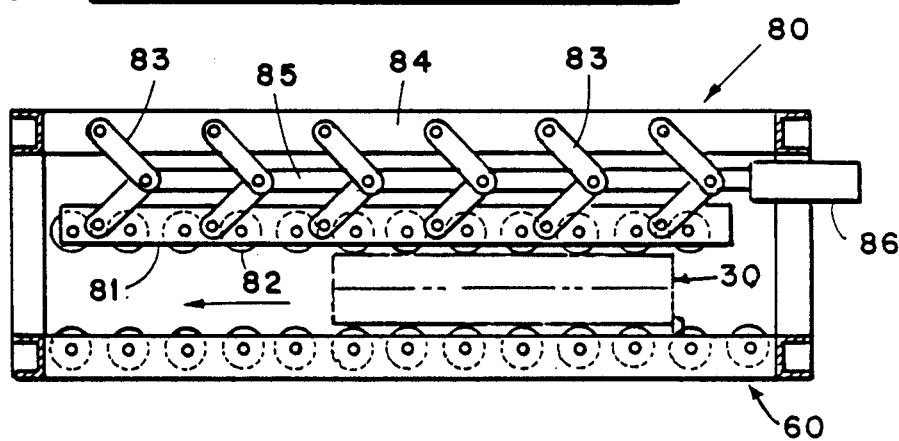
FIG. 7 is a side elevation view of a cooling or curing station illustrating one form of mold closure device.
Figure 8:
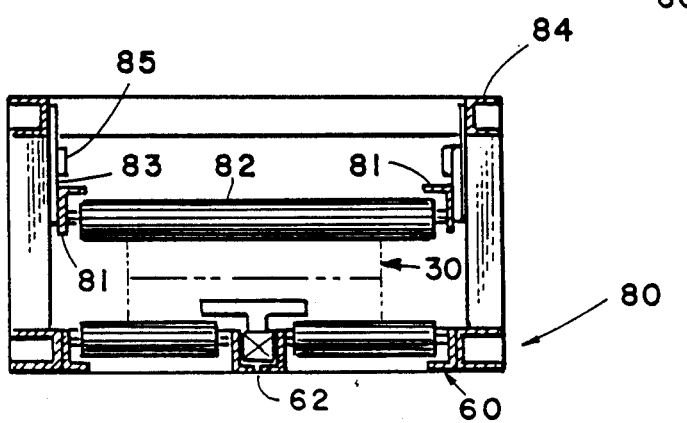
FIG. 8 is an end view of the cooling station illustrated in FIG. 5.

During the cooling process the cover is held closed. This provides enough pressure to effectively distribute the plastic material throughout the mold cavity. Equipment suitable for holding the mold closed is illustrated in FIGS. 7 and 8. The closed mold at station 25 is pushed into the cover clamp 80 which is equipped with a pair of rails 81 mounting rollers 82. The rails 81 are supported by toggles 83 depending from the beams 84. The toggles 83 on each side of the cover clamp 80 are connected by actuator bars 85 connected to an actuator 86 which, for example, could be a fluid operated cylinder. The fluid pressure supplied to the cylinder will be regulated to be sufficient to positively hold the cover closed. The length of the cover clamp 80 will be dependent upon the forward speed of the conveyor and the time lapse necessary to solidify the plastic to a condition in which clamping is no longer necessary. The larger and thicker the product the greater the volume of plastic and the greater the mass of the mold which must be cooled.

When molding products having significant plastic thickness differentials, in some areas it is desirable, if not essential, to vary the closing pressure to prevent sinks resulting from thermal shrinkage. Because this invention uses low pressure molding, the problem of sink formation is significantly less than that experienced with the high pressures of injection molding. However, in some designs it is necessary to prevent sink formation even when low pressure molding is used.

The cover clamp illustrated in FIGS. 7 and 8 is capable of accomplishing this objective. To do this the mold is so designed that the dam 38 creates a seal with the cover before the cover contacts the stop pins 39 (FIG. 3). When first placed on the base portion of mold the ribbon of plastic supports the cover in this slightly raised position. As the closed mold 30 enters the clamp the actuator is retracted such that the rollers 82 at first do not or only to a limited deqree further close the cover. The weight of the cover, in some cases with some additional pressure from the rollers 82, causes the ribbon of plastic to flow and migrate to fill all available space in the mold cavity. As the mold continues to pass through the clamp and the cooling progresses, the actuator gradually lowers the rollers 82, progressively closing the cover. This action is programmed to compensate for volume shrinkage by causing the plastic to migrate within the mold cavity to occupy those areas where the sinks would otherwise occur.

After the cooling has progressed to the point at which the molded article can be removed from the mold without distortion of the plastic, the mold is opened at station 26. This again is a function which can be fully automated. In the opening process the cover 32 is first separated vertically from the base portion 31 to give the cover room to swing upwardly in an arc without interference with the molded product. This action is possible because the hinge pins 41 can slide upwardly a short distance in the slots 42 (FIG. 3). The cover is then returned to its open, vertical position seen in FIGS. 3A and 6. If the mold is not at this point seated on an appropriate table, it is moved to station 27 where the knockout pins 41 are aligned with suitable ejectors which, when activated, force the pins 41 upwardly, ejecting the finished part. The empry mold 30 with cover open is then transported back to the inspection station 20. The return transport system may be used as a mold accumulator to assure a continuing supply of molds to maintain operation at the system's full capacity.

Charge station 23 is not necessarily limited to discharge of a single source of plastic. If the size of the product requires deposit of plastic in a volume which exceeds the discharge capacity of a single accumulator 71, two or more accumulators, 71a and 71b, can be used, each serviced by separate extruders 70, 70a and 70b. Each accumulator will discharge a separate ribbon of the plastic (FIG. 9). The three plastic sources could be used to discharge the same plastic or each could be used each to discharge plastic of a different color. For example, accumulator 71 could be used to discharge a broad basic ribbon 79 of black plastic on which accumulator 71a will discharge a narrower ribbon 79a of a different color, such for example as a white plastic and finally accumulator 71b will apply a still narrower ribbon 79b of another color, for example, a red plastic. By properly shaping the mold cavity and the use of low molding pressures, these ribbons can be made to retain their identity in the finished product. During the curing cycle the three ribbons will become bonded into an integrated product.

FIG. 19 illustrates one type of product which can be produced by this invention utilizing multiple plastic sources. The basic body 90 of product D is discharged into the mold cavity by accumulator 71 and the colored bead 91 by accumulator 71a. The two ribbons are then forced into their final shape by the mold when it is closed. The length of the bead 91 need not necessarily be co-extensive with that of the body. This can be controlled by the timing of the discharge interval for accumulator 71a. This can automatically be coordinated with the operation of accumulator 71 by time lapse controls.

FIG. 18 illustrates a product E which can be made by this invention. In this case one accumulator is equipped with a high volume nozzle while the second accumulator is equipped with a low volume nozzle. The nozzles could be arranged in a side-by-side relationship or in sequence. In either case, each discharges into a different portion of the mold with the resulting ribbons 79c and 79d of the same or different colors being welded together after the mold is closed. FIGS. 11 and 12 schematically illustrate an arrangement in which three accumulators utilize a single nozzle housing 77 equipped with three separate discharge orifices 78, 78a and 78b arranged laterally of the molds which will be passed under it. The nozzle housing 77 could be used to mold product E using, for example, nozzles 78 and 78b.

FIG. 17 illustrates a product F which can be fabricated by this invention in which surface sculpturing such as the arrow 94, letters 95 and recess 96 are molded into the surface of the final product. The invention is capable of impressing various surface textures and designs on the final product. Because the cover portion of the mold is initially moved vertically in both closing and opening, very delicate texturing can be produced. This also makes possible surface texturing with features in deep relief.

FIG. 21 illustrates a more conventional mold construction in which the primary cavity of the mold is recessed into the base portion. The choice of whether to use this arrangement or that illustrated in FIGS. 2 and 3 will be based on product design and adaption of the mold to the system of this invention. In either case the finished and thus ornamental face of the final product is in the more deeply recessed portion of the product. Therefore, it is important that the product can be released from the portion of the mold having the primary cavity without the use of knock-out pins or their equivalent. In this connection, it is important to the operation of the mold that the initial opening movement of the mold is non-arcuate. The design of that portion of the product formed by the upper portion of the mold including any inserts which may have been used could provide sufficient resistance to separation to assure withdrawal of the product from the lower mold even though substantial relief design is involved.

A wide variety of plastic materials can be utilized in the practice of this invention. Polyvinyl chloride polymers, for example, are among those are particularly adapted to use with this molding system. The system can also utilize vinyls and has the advantage of being able to produce products having the high gloss surface of which molded vinyls are capable. The system solves serious production problems which have plagued those trying to mold products from plastics having a high metallic filler content. These cannot be made by injection molding because the metallics make visible the flow lines of the plastic material as it is distributed in the mold. However, since extrusion provides no means for finishing the ends of the product, it is impossible to create a product having a single, unified appearance.

This problem is solved by this invention because a single process forms the entire product utilizing a technique which effectively creates a uniform distribution of the filler throughout the entire product. It has been found that by recessing the mold cavity into the cover portion of the mold and utilizing a closure procedure which progressively and firmly completes the mold closure over a planned interval after the cover has been placed on the plastic ribbon which has been discharged onto the base portion of the mold that uniform filler distribution can be obtained. The resulting products are free of visible swirls and flow lines even in the case of products molded of vinyls having reflective metallic fillers creating an impression of visual depth. In processes heretofore used for the manufacture of such products including extrusion with accumulators, the flow of the resin as the sides of the strip were formed, exhibited an attenuation or progressive reduction in filler density giving a less than uniform appearance.

A significant advantage of this invention over other molding techniques is the system's ability to cope with products which require processing steps of varying lengths. In conventional injection molding the productivity of the system is totally controlled by the molding cycle of the injection equipment. Further, this equipment represents most of the investment and operating cost of the system. Any step a particular product requires which lengthens the operating cycle of the injection equipment becomes a serious cost factor. An example of this is having to hold the mold open while inserts are put in place in the mold. Parts which require high molding temperatures or longer than usual dwell time for the plastic to set or significant dwell time for insert installation significantly increase cost, in fact, in the case of some products to the point of making their cost impractical. This is true in conventional injection molding techniques because the mold and the injection equipment are, in effect, integral and anything that requires an additional delay in the opening and closing of the mold decreases the productivity of both mold and extruder.

Another undesirable characteristic of conventional injection molding procedures is that any changes, even slight changes, require the injection process to be halted while the mold is removed and marked. Even if the changes or modifications can be performed without dismounting the mold the interruption of the machines constitutes a significant productivity loss and cost increase. When the molds have to be removed, not only is there significant delay in doing this there is even greater delay in returning them to the injection equipment because they must be rechecked for alignment and tested. If the mold is a large, multi-cavity mold all cavities are simultaneously taken out of production.

This invention overcomes this problem. The need for an expensive machine which integrates almost all the functions in a single machine is eliminated. Numerous molds 30 can be provided at a small portion of the cost of the conventional high pressure mold for injection molding and will equal or exceed the productivity of the conventional injection molding equipment. With numerous individual molds, several can be processed simultaneously at one of the stations, if necessary, while a continuous, uniform flow of molds through the charging station 23 can be maintained. This is important because the number of molds per unit of time which are charged with plastic at station 23 governs the productivity of the entire system. However, in the process of this invention the fact that a part requires additional time for process steps other than simply depositing plastic in the mold need not affect the production rate of the charging station. Because these steps are performed outside the charging station, the dwell time required to complete these steps need not affect the charging station. This materially broadens the scope of product designs which can be considered to be cost effective. Changes and modifications of the molds can be done mold by mold without interfering with the operations of the extruder. All changes are made at an appropriate mold service station while the extursion equipment continues production without interruption. While our mold is being modified or serviced, other molds are continuing to move through the system maintaining full production. This is in addition to the fact that the invention makes possible for the first time products which must have a finished appearance on all faces or at least top and all sides and ends and made from plastic having a filler of visible particulate material.

Because the molds are comparatively inexpensive the invention can be used to produce products having low production volume. The volume of a particular product to be produced will determine the number of molds used. It is entirely possible to produce simultaneously products of more than one design. This can be done by programming the various stations to perform differently with each type of mold. This will be particularly important in the case of the discharge station 23 where various means could be provided to control the station to discharge the correct type and quantity of plastic required by the particular prcduct being molded.

The process of this invention can be used to mold a transparent layer of plastic of the type subject to stress impairment of its transparency over a metal or plastic insert to provide a distortion free appearance of depth. Particularly the process is practical for molding clear vinyls for this purpose. The invention is also applicable to encapsulation processes where high pressures cannor be tolerated. An example of this would be the encapsulation of electronics equipmcnt to prorect it from water or contamination. It is also possible to extrude a base of single or multiple ribbons which may be of the same or different colors and simultaneously overlay them with a layer of transparent material such as vinyl and by the pressure created by mold closure mold all the ribbons into a single unified product.

While the invention has been described as applied primarily to automatic products, it has many applications in other fields such, for example, as furniture, appliances, architectural, physical fitness and health science products.

While a preferred embodiment of the system of this invention has been described, it will be recognized that various modifications of the system can be made without departing from the principles of the invention. Such modifications are to be considered as included in the hereinafter appended claims unless the claims, by their language, expressly state otherwise.

I claim:

1. The method for forming an extruded product of thermoplastic material by low pressure molding including the steps of providing a plurality of molds each having a base and a cover which when closed form a closed internal cavity shaped to form the top, sides and ends of the product, continuously transporting the molds in sequence around a closed circuit, preparing each mold to receive a charge of moldable thermoplastic material, sequentially moving each mold beneath a source of plastic material, while the mold is open flowing a charge of extruded thermoplastic material into each mold, removing each mold from the source of the plastic material, by means of the cover simultaneously closing and sealing the cavity in the mold while applying at least sufficient pressure to distribute the plastic material throughout the mold cavity whereby all areas of the mold are filled with plastic and the plastic will accuratedly reproduce the configuration of the cavity, cooling the mold sufficiently that the molded product can be removed without distortion of its molded configuration; as the mold and plastic are being cooled further closing the mold data rate to progressively compensate for thermal shrinkage of the plastic; precisely measuring the volume of plastic material discharged into the mold such that the mold cavity when initially sealed will hold the entire change of plastic delivered into the mold and such amount will be equal to the volume of the mold cavity when the plastic material has cooled to a temperature at which the molded product can be removed from the mold.

2. The method of low pressure molding described in claim 1 wherein the plastic material contains a substantial percentage of visual metallic material in particulate form.

3. The method of low pressure molding described in claim 2 wherein the plastic material is a transparent vinyl.

4. In a method of forming extruded parts from a thermoplastic material the steps which include providing a mold of a material having a thermal conductivity at least that of aluminum, the mold having a base and cover which when closed forms an internal mold cavity, moving the mold along a closed endless path and while the mold is so moving opening the mold to expose the cavity and heating the mold to receive a charge of thermoplastic material, moving the mold beneath a source of plastic material, extruding a ribbon of moldable thermoplastic material and releasing it by gravity into the open mold while measuring the quantity of material deposited to provide a volume thereof which will be equal to the volume of the mold cavity when the mold is fully closed and cooled to a temperature at which the molded part can be removed, covering the plastic material with the cover and simultaneously closing and sealing the mold cavity, applying a closing pressure to the cover of an amount only sufficient to cause the plastic material to migrate to and entirely fill all portions of the cavity, cooling the mold to cause the plastic material to set, as the plastic is cooled progressively further reducing the volume of the cavity by mold closure sufficiently only to compensate for shrinkage of the plastic as it cools and, when the plastic has been cooled sufficiently that the extruded-molded part can be removed without permanent distortion opening the mold and reoving the molded part, returning the mold for reuse.

5. The method of molding plastic parts as described in claim 4 including the further step of placing a reinforcement element in the mold as the mold is being prepared, while the mold is closed bonding the reinforcement element to the plastic.

6. In the method of molding plastic parts as described in claim 5 including the further step of detachably securing the reinforcement strip to the cover of the mold.

7. In the method of molding plastic parts as described in claim 5 including the further step of detachably securing the reinforcement strip to the base of the mold.

8. In the method of molding reinforced plastic parts as described in claim 4 including the further steps of providing a plurality of molds arranged in tandem along the endless path, depositing by extrusion the ribbon of plastic material from a position directly over the molds as they are moved continuously past the source of plastic material, utilizing each mold to initiate and terminate the extrusion of the ribbon of plastic 9. The method of forming an elongated ribbon-like product of the type which may be used as body side moldings or bumper rub strips for automobiles and having shaped molded ends integral with the main body of the strip by molding a ribbon of plastic material, including the steps of providing a mold having a base portion and a cover portion at least one of which portion has a recess therein, the mold when closed having an internal cavity shaped to form the top, bottom, sides and ends of the product, heating the mold, while the mold is open depositing a ribbon of moldable thermoplastic material on the base portion, measuring the quantity of material deposited on the base portion to provide a volume thereof which will be equal to the volume of the space within the mold cavity when the mold is fully closed and the plastic has been cooled to a temperature at which the molded part will maintain the integrity of its molded shape when removed from the mold, simultaneously closing the mold and sealing the mold cavity with the cover portion, and after sealing by means of the cover portion exerting pressure on the plastic material just sufficient to distribute the plastic material uniformly throughout the mold and entirely fill the mold cavity and cooling the mold to set the plastic material until it can be removed from the mold without loss of shape, during the cooling of the plastic further closing the mold at a rate to both compensate for volume shrinkage, maintain total occupancy of the mold cavity and prevent the formation of sinks in the molded product, opening the mold and removing the molded part and returning the mold for reuse.

10. The method of molding the ribbon-like product as described in claim 9 including the further steps of seating a metallic reinforcement member within the mold cavity and detachably securing it to one of the base or cover portions with the ends of the member spaced from both ends of the cavity and while closing the mold causing the plastic material to flow over and encase both ends, both sides and the surface of the reinforcement facing the portion of the mold to which the reinforcement is not attached and bonding the plastic to the reinforcement.

11. The method of molding the ribbon-like product as described in claim 10 including the further steps of providing the recess in the cover portion and securing the reinforcement to the base portion and depositing the plastic material on the reinforcement and forcing the plastic marerial to flow upwardly into and fill the recess as the mold is closed.

12. The method of molding the ribbon-like product as described in claim 9 including the further steps of providing a plastic material containing a quantity of reflective metallic particles uniformly distributed therein, controlling the rate of closure of the mold to distribute the plastic material while maintaining a uniform dispersement of the metallic particles to all portions of the mold occupied by the plastic material, thus producing a uniformity of appearance within the resulting metallic substructure.

13. The method of molding the ribbon-like product as described in claim 9 including the further steps of providing a plastic material containing a quantity of reflective metallic particles uniformly distributed therein, controlling the rate of closure of the mold to distribute the plastic material with a uniform density and dispersion of the metallic particles to all portions of the mold occupied by the plastic material.

14. The method of molding the ribbion-like product as described in claim 9 including the step of continuously moving the mold throughout all the steps.

15. The method of molding the ribbon-like product described in claim 9 including the step of depositing at least two ribbons of moldable plastic material on the base portion.

16. The method of molding the ribbon-like product described in claim 9 wherein the ribbons are of different cross-sectional volume and color.

17. The method of molding the ribbon-like product described in claim 9 wherein the rate of movement of the mold past the source of the plastic material is varied to vary the cross-sectional volume of plastic material deposited on the mold per unit of length of the mold.

18. The method of molding the ribbon-like product described in claim 15 wherein the ribbons are deposited sequentially while the mold is moving past the source of plastic material.

19. The method of molding plastic parts as described in claim 4 including the further step depositing at least two separate ribbon-like quantities of plastic material in the open mold as the mold is moved past the source of plastic material.

20. The method of molding plastic parts as described in claim 19 including the further step of depositing the ribbons of plastic material sequentially during the same passage of the mold past the plastic material source.

21. A system for molding elongated ribbon-like plastic strips from a thermoplastic material, said system comprising: a plurality of stations, a plurality of molds each having a base portion and a cover portion at least one of which has a mold cavity recess therein shaped to form the strip when the mold is closed, said mold being made of a non-ferrous material, transport means interconnecting all of the stations; at least one of the stations having means for preparing the molds to receive a charge of moldable thermoplastic material; another station having means under which the molds pass in tandem for flowing a ribbon of precise and predetermined volume of hot thermoplastic material into each mold as it passes through the station; mold controlled means for controlling the discharge of the plastic material such that the length and volume of the discharged ribbon is commensurate with the length and volume of the mold cavity; means or closing the mold and sealing the mold cavity, pressure exerting means for engaging the mold and solely by pressure exerted by said means on the cover pressurizing the plastic material at least to that necessary to cause the mold cavity to be entirely filed with the plastic material and be impressed with the configuration of the mold cavity said pressure exerting means including means to limit the closing pressure only to that necessary to positively fill the mold cavity with the material and to thereafter continue to progressively reduce the size of the mold cavity at a rate commensurate with the rate of shrinkage of the plastic as it cools to cause adequate material migration within the cavity to prevent sink formation or other distortion during cooling; and means for removing the molded strip after it has cooled until it can be removed without distortion of its physical shape.

22. The system described in claim 21 wherein the transport means includes a section for returning the emptied molds to the station having the mold preparation means.

23. The system described in claim 21 wherein the molds are fabricated fro maluminum and have means for releasably holding an insert for incorporation into the molded plastic strip.

24. The system described in claim 22 wherein a dam is secured to one of the mold portions and shaped to surround the mold cavity and projects beyond the surface of the mold portion to which it is secured for engaging and forming a plastic material confining seal with the other portion of the mold before the mold portions are moved to fully closed position to pressurize the plastic material deposited in the mold.

25. In the method of molding plastic parts as described in claim 4 wherein a plurality of molds are provided arranged in tandem along the endless path, providing means for continuously moving the molds along the path, varying the rate of movement of the molds as the ribbon of plastic material is deposited into them to vary the volume of material deposited at various points along the mold cavity in accordance with changes in the shale and plastic volume requirements of the particular mold.

26. A system for molding a plastic product from a thermoplastic material, said system comprising: a plurality of stations, a plurality of molds each having a base portion and cover portion at least one of which has a mold cavity therein shaped to form the product when the mold is closed, transport means interconnecting all of the stations; at least one of the stations having means for preparing the molds to receive a change of moldable thermoplastic material; another station having a nozzle for flowing into each mold while the mold is present at the station a discrete quantity of hot thermoplastic material, said quantity being of a precise and predetermined volume and means for controlling the discharge of the plastic material such that the volume of the discharged material is commensurate with the volume of such material in the product being molded at the time the molded product is removed from the mold; means for closing the mold and sealing the mold cavity and means acting on the cover for pressurizing the plastic material to apply to the plastic material only that force which is necessary to cause the mold cavity to be entirely filled and the plastic material be impressed with the precise configuration of the mold cavity, means to thereafter cool and the mold and plastic, control means to prgressively reduce the size of the mold cavity during cooling by closure movement of the cover at a rate commensurate with the rate of shrinkage of the plastic as it cools to cause adequate material migration within the cavity to maintain at all times total occupancy of the cavity and to prevent sink formation or other distortion during cooling; and means for removing the molded product after it has cooled until it can be removed without distortion of its physical shape.

27. A system for molding plastic product from a thermoplastic material, said system comprising: a plurality of staitons, a plurality of molds each having a base portion and a cover portion at least one of which has a mold cavity therein shaped to form the product when the mold is closed, transport means interconnecting all of the stations; at least one of the stations having means for preparing the molds to receive a charge of moldable thermoplastic material; a mold charging station having a nozzle for flowing into each mold while the mold is present at the station a discrete qunatity of precise and predetermined volume of hot thermoplastic material and means for controlling the discharge of the plastic material such that the volume of the discharged material is commensurate with the volume of the product to be modlded at the time it is removed from the mold; means for closing the mold to seal the mold cavity against escape of any of the plastic material therein and for progressively continuing the closing at a rate commensurate with the reduction in volume of the plastic therein resulting from cooling, said means including a control element to maintain at all times total occupancy of the cavity by the plastic and to prevent the formation of sinks and to limit the closing pressure only to that necessary to maintain said condition; means for removing the molded product after it has cooled to a temperature at which it can be removed without distortion of its physical shape.

28. A system for molding a plastic product from a thermoplastic material, said system comprising: a plurality of molds each having a base portion and cover portion at least one of which has a mold cavity therein shaped to form the product when the mold is closed, a mold charging station; means for delivering a mold in open condition to said charging station to receive a charge of thermoplastic material in moldable condition; said mold charging station having a nozzle for flowing into each mold while the mold is present at the station, a discrete quantity of precise and predetermined volume of hot thermoplastic material and means for controlling the discharge of the plastic material and such that the volume of the discharged material is commensurate with the volume of the product to be molded at the time it is removed from the mold; means for closing the mold to seal the mold cavity against the escape of any of the plastic material therein and means for thereafter applying sufficient pressure to the plastic material to assure total occupancy of the mold cavity by the plastic material and control means for thereafter progressively continuing the closing at a rate commensurate only with the reduction in volume of the plastic therein resulting from cooling while maintaining a total occupancy of the cavity by the plastic; means for removing the molded product after it has cooled until it can be removed without distortion of its physical shape.

29. A system for molding a plastic product as described in claim 28 wherein the product is of a substantially ribbon/robe like configuration having a substantially greater length than width wherein means are provided at the mold charging station for moving one of the nozzle or the mold with respect to the other lengthwise of the mold to deposit the charge of plastic as a ribbon/rope like strand extending substntially the length of the mold cavity.

30. A system for molding a plastic product as described in claim 29 wherein the nozzle has valve means for controlling the flow of plastic therethroug, actuator means for said control means having a mold sensor for detecting the presence of a mold cavity positioned to receive plastic from said nozzle.

31. A system for molding a plastic product as described in claim 27 wherein at least two nozzles are provided, each supplied from a differnet source of plastic material, independent means for controlling the discharge of plastic material from each of the nozzles whereby discrete quantities of plastic can be simultaneously discharged into the mold by each nozzle.

32. A system for molding a plastic product from a thermoplastic material, said system comprising: a mold having a base portion and cover portion at least one of which has a mold cavity therein shaped to form the product when the mold is closed, a mold charging station having a nozzle for flowing into the mold hot thermoplastic material and means for controlling the discharge of the plastic material such that the volume of the discharged material is precisely commensurate with that necessary to produce a product which will entirely occupy the mold cavity at the time it is removed from the mold; closure means for closing the mold to seal the mold cavity against escape of any of the plastic material therein and applying a positive pressure to the plastic in the mold cavity, said pressure being only sufficient to so distribute the plastic that all portions of the mold cavity are entirely filled and pressure means for progressively continuing the closing at a rate commensurate with the reduction in volume of the plastic therein resulting from cooling to maintain total occupancy of the cavity by the plastic at all times until the charge has cooled sufficiently that the molded product can be removed without distortion of its physical shape; means for removing the molded product.

33. A system for molding a plastic product as described in claim 32 wherein the nozzle has a discharge opening of approximately the same size and shape as the cross sectional shape of the mold cavity.

34. The method of molding a plastic product from thermoplastic material including the steps of providing a mold having a removable cover to provide access to an internal mold caivty, while the cover is removed flowing into the mold a charge of hot thermoplastic resin and simultaneously measuring the volume of the charge such that it will equal the volume of the mold cavity when the mold is fully closed and the charge has been cooled sufficiently that the molded product can be removed from the cavity without distortion of its physical shape, closing the mold contain the entire charge and to seal the mold cavity against escape of any of the plastic material and simultaneously applying pressure to the charge of a magnitude only sufficent to cause the plstic material to entirely fill the mold cavity and accurrately reproduce the configuration thereof, thereafter continuing to progressively close the mold at a rate sufficient to create only enough pressure on the plastic to maintain the established relationship between the quantity of the charge and the volumetric capacity of the mold cavity and prevent the formation of any sinks or separation of the plastic from the walls of the cavity as the volume of the charge decreases in response to cooling until the plastic has cooled to a condition permitting removal.

35. The method of molding a plastic product as described in claim 34 including the further steps of so shaping the charge of material as deposited in the mold that upon closure of the mold and pressurizing the material substantially all of the flow of the material will be lateral rather than lengthwise.

36. The method of molding a plastic product described in claim 34 including the further steps of preparing the plastic material in an extruder, discharging the plastic material from the extruder into an accumulator and in the accumulator permitting the material to release the stresses acquired during extrusion and flowing the plastic from the accumulator at a rate such that it is discharged into the mold in an unstressed condition.

37. The method of molding a plastic product described in claim 34 including the further stesp of so flowing the charge into the mold that the shape of the charge before mold closure closely approximates the shape of the mold cavity to minimize plastic migration after the mold is closed and pressure is applied to the charge.

38. The method of molding a plastic product having the appearance of depth from a thermoplastic material containing a dispersion of discrete relfective particles including the steps of providing a mold having a removable cover to provide access to an internal mold cavity, preparing the plastic material in an extruder, discharging the plastic material from the extruder into an accumulator and in the accumulator permitting the material to become a homogenous mass by releasing the stresses and eliminating the flow patterns acquired during extrusion and while the cover of the mold is removed, flowing the plastic from the accumulator at a rate such that it is discharged into the mold in an unstressed condition without visual flow pattern and simultaneously measuring the volume of the charge such that it will equal the volume of the mold cavity when the mold is fully closed and the charge has been cooled sufficiently that the molded product can be removed from the cavity without distortion of its physical shape, closing the mold to seal the mold cavity against escape of any of the plastic material and thereafter applying to the charge only that amount of pressure necessary to cause the plastic material to entirely fill the mold cavity and reproduce the configuration thereof without creating visible flow patterns in the plastic, thereafter progressively further closing the mold at a rate sufficient to maintain the established relationship between the quantity of the charge and the volumetric capacity of the mold cavity as the volume of the charge decreases in response to cooling until the plastic has cooled to a condition permitting removal.

39. The method of molding a plastic product described in claim 38 including the further steps of so flowing the charge into the mold that the shape of the charge before mold closure closely approximates the shape of the mold cavity to minimize plastic migration after the mold is closed and pressure is applied to the charge.

* * * * *

UNITED STATES PATENT AND TRADEMARK OFFICE
CERTIFICATE OF CORRECTION

PATENT NO. : 4,751,029

DATED : June 14, 1988

INVENTOR(S) : Clifford D. Swanson

It is certified that error appears in the above-identified patent and that said Letters Patent is hereby corrected as shown below:

Column 1, line 32:
    "ro" should be --to--
Column 1, line 56:
    "capaciry" should be --capacity--
Column 3, line 37:
    "accmplished" should be --accomplished--
Column 3, line 53:
    ";nsert" should be --insert--
Column 7, line 61:
    "ro" should be --to--
Column 9, line 65:
    After "the" delete "15".
Column 11, line 29:
    "deqree" should be --degree--
Column 11, line 55:
    "empry" should be --empty--
Column 14, line 28:
    "extursion" should be --extrusion--
Column 14, line 55:
    "cannor" should be --cannot--
Column 14, line 57:
    "prorect" should be --protect--
Column 15, line 26:
    "accuratedly" should be --accurately--
Column 15, line 31:
    "data rate" should be --at a rate--
Column 15, line 34:
    "change" should be --charge--
Column 16, line 5:
    "reoving" should be --removing--
Column 16, lines 32 and 33:
    "portion" should be --portions--

UNITED STATES PATENT AND TRADEMARK OFFICE
CERTIFICATE OF CORRECTION

PATENT NO. : 4,751,029

DATED : June 14, 1988

INVENTOR(S) : Clifford D. Swanson

It is certified that error appears in the above-identified patent and that said Letters Patent is hereby corrected as shown below:

Column 17, line 26:
    "ribbion-like" should be --ribbon-like--
Column 18, line 3:
    "or" should be --for--
Column 18, line 25:
    "fro maluminum" should be --from aluminum--
Column 18, line 44:
    "shale" should be --shape--
Column 19, line 12:
    "staitons" should be --stations--
Column 19, line 21:
    "qunatity" should be --quantity--
Column 19, line 26:
    "modlded" should be --molded--
Column 19, line 68:
    "robe" should be --rope--
Column 20, line 5:
    "substntially" should be --substantially--
Column 20, line 9:
    "therethroug" should be --therethrough--
Column 20, line 51:
    "caivty" should be --cavity--
Column 20, line 63:
    "plstic" should be --plastic--
Column 21, line 20:
    "stesp" should be --steps--

UNITED STATES PATENT AND TRADEMARK OFFICE
CERTIFICATE OF CORRECTION

PATENT NO. : 4,751,029

DATED : June 14, 1988

INVENTOR(S) : Clifford D. Swanson

It is certified that error appears in the above-identified patent and that said Letters Patent is hereby corrected as shown below:

Column 21, line 28:
"relfective" should be --reflective--

Signed and Sealed this

Twenty-eighth Day of February, 1989

Attest:

DONALD J. QUIGG

Attesting Officer

Commissioner of Patents and Trademarks